United States Patent Office 3,388,079
Patented June 11, 1968

3,388,079
HIGH MOLECULAR WEIGHT POLYETHERS
CONTAINING SILANE GROUPINGS
Edwin J. Vandenberg, Wilmington, Del., assignor to Hercules Incorporated, a corporation of Delaware
No Drawing. Filed Apr. 26, 1966, Ser. No. 545,237
10 Claims. (Cl. 260—2)

This invention relates to cross-linkable polyethers containing silyl groupings and, more particularly, to high molecular weight copolymers of monoepoxy silanes with oxiranes or oxetanes.

High molecular weight copolymers prepared by the polymerization of oxiranes, oxetanes, etc., with other epoxide monomers are well known. However, these copolymers are not self-cross-linkable, and, due to the fact that they contain at best no more than one active hydrogen end group per polymer molecule, cannot be easily modified. Obviously, any means by which the reactivity of the polymer can be increased greatly enhances the utility of the polymer.

It has now been found that certain epoxy-substituted silanes can be copolymerized with oxiranes or oxetanes to give high molecular weight copolyethers which are self-cross-linkable and, by virtue of improved reactivity, chemically bind silica and related fillers to the polyether. More specifically, the present invention provides new and useful high molecular weight polyethers comprising copolymers of an epoxy silane of the formula $RSiZ_nY_{3-n}$, where R is a monoepoxy-substituted radical attached to silicon through a Si—C linkage; Z is a member selected from the group consisting of —OR', —OSiR"$_3$, halogen, hydrocarbon, and halohydrocarbon; Y is a member selected from the group consisting of —OR', —OSiR"$_3$, halogen, and hydrogen; and $n$ is 1 or 2 where R' is alkyl, aryl, cycloalkyl, aralkyl, alkoxyalkyl, haloalkyl, alkaryl, or haloaryl, and R" is hydrogen or a hydrocarbon or halohydrocarbon radical, and a comonomer selected from the group consisting of oxiranes and oxetanes.

The copolymers of this invention are polyethers having side chains containing silane radicals that contain functional groups such as —OR' and halogen which are readily hydrolyzed to silanol groupings which bond to siliceous fillers and form cross-linked products, or contain hydride groupings which are less reactive but can be converted to reactive silanol groupings, or contain nonfunctional groups such as —OSiR"$_3$ where R" is for example, alkyl, which rearrange with appropriate catalysts to give cross-linking or the other desired advantages of the invention. The case with which the epoxy silanes containing functional groups give cross-linked products makes those epoxy silanes wherein Z and/or Y are OR' or halogen, i.e., chlorine, bromine, fluorine, or iodine, particularly preferred. Typical groups which R' can comprise include alkyl and haloalkyl groups containing 1 to 10 carbon atoms such as methyl, ethyl, n-propyl, n-butyl, isobutyl, pentyl, hexyl, n-decyl, chloromethyl, chloroethyl, and the like; aryl or haloaryl groups containing 6 to 15 carbon atoms such as phenyl, chlorophenyl, diphenyl, and the like; cycloalkyl groups of 6 to 15 carbon atoms such as cyclohexyl, methylcyclohexyl, cyclopentyl, and the like; aralkyl groups of 7 to 15 carbon atoms such as phenylmethyl, chlorophenylmethyl, nonylphenylmethyl, phenylethyl, phenylbutyl, and the like; alkaryl groups of 7 to 15 carbon atoms such as methylphenyl, ethylphenyl, nonylphenyl, and the like; alkoxyalkyl groups of 2 to 11 carbon atoms such as methoxymethyl, ethoxyethyl, methoxypropyl, methoxypropoxypropyl, etc. Typical hydrocarbon or halohydrocarbon groups which Z can also comprise include alkyl, aryl, cycloalkyl, alkaryl, aralkyl, haloalkyl, or haloaryl radicals, typical examples of which are listed above with respect to the definition of R'.

The epoxy portion (R in the formula) of the silane monomers used to produce the copolymers of this invention is a monoepoxy-substituted radical attached to silicon through a Si—C linkage. Preferred radicals which R can comprise have the formula

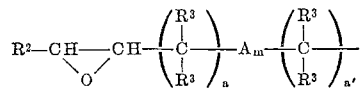

where $R^2$ is hydrogen, a univalent hydrocarbon or halohydrocarbon radical such as alkyl, cycloalkyl, aryl, alkaryl, haloalkyl, haloaryl, or aralkyl group, or, together with the carbon atoms of the epoxy group, part of an alicyclic ring structure; $R^3$ is hydrogen, halogen, or a univalent hydrocarbon, oxyhydrocarbon, or halohydrocarbon radical; A is oxygen or sulfur; $m=0$ or 1; and $a$ and $a'$ are 0 to 10 with the proviso that when $m=1$, $a'$ is a who number of at least 1. Particularly preferred groups which $R^3$ can comprise are hydrogen, chlorine, bromine, fluorine, iodine, alkyl, aryl, alkaryl, aralkyl, haloalkyl, haloaryl, alkoxy, aryloxy, cycloalkoxy, aralkoxy, alkanyloxy, alkoxyalkoxy, etc.

Preferred hydrocarbon and halohydrocarbon groups which Z and R" as well as $R^2$ and $R^3$ can comprise include alkyl or haloalkyl groups containing 1 to 10 carbon atoms such as methyl, ethyl, n-propyl, n-butyl, isobutyl, pentyl, hexyl, n-decyl, chloromethyl, chloroethyl, and the like; aryl or haloaryl groups containing 6 to 15 carbon atoms such as phenyl, chlorophenyl, diphenyl, and the like; cycloalkyl groups of 6 to 15 carbon atoms such as cyclohexyl, methylcyclohexyl, cyclopentyl, and the like; aralkyl or haloaralkyl groups of 7 to 15 carbon atoms such as phenylmethyl, chlorophenylmethyl, nonylphenylmethyl, phenylethyl, phenylbutyl, and the like; and alkaryl groups of 7 to 15 carbon atoms such as methylphenyl, ethylphenyl, nonylphenyl, and the like. Preferred oxyhydrocarbon groups which $R^3$ can also comprise include alkoxy groups of 1 to 10 carbon atoms such as methoxy, ethoxy, propoxy, etc.; aryloxy groups of 6 to 15 carbon atoms such as phenoxy, phenylphenoxy, etc.; cycloalkoxy groups of 6 to 15 carbon atoms such as cyclohexoxy methylcyclohexoxy; aralkoxy groups of 7 to 15 carbon atoms such as phenylmethoxy, nonylphenylmethoxy, phenylethoxy, etc.; and alkaryloxy groups of 7 to 15 carbon atoms such as methylphenoxy, ethylphenoxy, nonylphenoxy, and the like.

Exemplary of these preferred epoxy silane monomers are the glycidoxyalkyl alkoxy or halo silanes such as glycidoxymethyl trimethoxysilane, glycidoxyethyl trimethoxysilane, glycidoxypropyl trimethoxysilane, glycidoxy-n-butyl dimethoxymethylsilane, glycidoxyhexyl methoxydimethylsilane, glycidoxyoctyl trichlorosilane, glycidoxypropyl methoxydimethylsilane, glycidoxypropyl methoxydiphenylsilane, and the like; the cis- or trans-2,3-epoxybutoxyalkyl trimethoxysilanes such as cis-2,3-epoxybutoxypropyl trimethoxysilane,
trans-2,3-epoxybutoxypropyl trimethoxysilane,
cis-2,3-epoxybutoxypropyl methoxydimethylsilane,
cis-2,3-epoxybutoxypropyl dimethoxymethylsilane, and the like; the 1,2 epoxyalkyl trimethoxysilanes such as glycidyl trimethoxysilane,
1,2-epoxypropyl trimethoxysilane,
1,2-epoxypropyl methoxydimethylsilane,
1,2-epoxypropyl dimethoxymethylsilane,
1,2-epoxybutyl methoxydimethylsilane,
1,2-epoxybutyl dimethoxymethylsilane,
1,2-epoxypentyl methoxydimethylsilane,
1,2-epoxypentyl dimethoxymethylsilane,
1,2-epoxyhexyl methoxydimethylsilane, 1,2-epoxyhexyl dimethoxymethylsilane, and the like; the 2,3-epoxyalkyl trimethoxysilanes such as
cis-2,3-epoxypropyl trimethoxysilane,
2,3-epoxybutyl trimethoxysilane,
cis- and trans-2,3-epoxypentyl trimethoxysilane,
2,3-epoxypentyl methoxydimethylsilane,
2,3-epoxypentyl dimethoxymethylsilane,
2,3-epoxyhexyl trimethoxysilane,
2,3-epoxyhexyl methoxydimethylsilane,
2,3-epoxyhexyl dimethoxymethylsilane, and the like; the 3,4-epoxycyclohexyl-1-alkyl trimethoxysilanes such as
3,4-epoxycyclohexyl-1-methyl trimethoxysilane,
3,4-epoxycyclohexyl-1-ethyl trimethoxysilane,
3,4-epoxycyclohexyl-1-propyl trimethoxysilane,
3,4-epoxycyclohexyl-1-butyl trimethoxysilane,
3,4-epoxycyclohexyl-1-methyl dimethoxymethylsilane,
3,4-epoxycyclohexyl-1-ethyl dimethoxymethylsilane,
3,4-epoxycyclohexyl-1-propyl dimethoxymethylsilane,
3,4-epoxycyclohexyl-1-butyl dimethoxymethylsilane,
3,4-epoxycyclohexyl-1-methyl methoxydimethylsilane,
3,4-epoxycyclohexyl-1-ethyl methoxydimethylsilane,
3,4-epoxycyclohexyl-1-propyl methoxydimethylsilane,
3,4-epoxycyclohexyl-1-butyl methoxydimethylsilane, and the like; the 3,4-epoxycyclohexyl-1-alkyloxyalkyl trimethoxysilanes such as 3,4-epoxycyclohexylmethyloxypropyl trimethoxysilane and the like; the glycidylthioalkyl trimethoxysilanes such as glycidylthiopropyl trimethoxysilane, glycidylthiopropyl methoxydimethylsilane, glycidylthiopropyl dimethoxymethylsilane, and the like.

Another type of epoxy silane that can be used in preparing the copolymers of the invention is a monomer of the general formula $RSiZ_nY_{3-n}$ which can contain from 1 to 3 —$OSIR''_3$ groupings and wherein the other Z's or Y's, if present, and R" are as defined above. In addition, R" can be a repeating siloxy group such as dimethylsiloxyl, methylhydrogensiloxyl, phenylmethyl siloxyl, diphenylsiloxyl, and the like. These epoxy silanes, if they do not contain functional groups, can be rearranged with appropriate catalysts to give cross-linking or interaction with siliceous filler. Such rearrangements are known and can be carried out with heat and/or catalysts, and preferably by heating at about 100 to 400° C. in the presence of such catalysts as thin, lead, or zinc oxides or carboxylates, inorganic acids such as sulfuric or hydrochloric, aluminum chloride, ferric chloride, boric oxide, etc. Preferred epoxy silanes of this type include glycidoxyalkyl bis(trialkylsiloxy)alkylsilanes, glycidoxyalkyl bis(triarylsiloxy) alkylsilanes, glycidoxyalkyl bis(trialkylsiloxy) arylsilanes, glycidoxyalkyl tris(trialkylsiloxy) alkylsilanes, glycidoxyalkyl trialkylsiloxydialkylsilanes, etc., and specifically glycidyldimethoxy dimethylsiloxysilane, glycidoxypropyl bis(trimethylsiloxy)methylsilane, glycidoxypropyl bis(triethylsiloxy)methylsilane, glycidoxypropyl tris(trimethylsiloxy)methylsilane, and glycidoxypropyl dimethoxy(heptamethyltrisiloxyl)silane.

Still another type of epoxy silane that can be used in preparing the copolymers of the invention is a monomer of the general formula $RSiZ_nY_{3-n}$ which contains 1 to 2 hydride groups and the other Y, if present, and Z are as defined above. Typical epoxy silanes of this type are glycidoxypropyl dimethylsilane, glycidoxypropyl methylsilane, and glycidoxypropyl phenylsilane.

Such epoxy silanes are known compounds and can be prepared, for example, according to the method of J. L Speir, J. A. Webster & G. H. Barnes, J. Am. Chem. Soc. 79, 974 (1957).

The comonomers which are polymerized with the above epoxy silanes are oxiranes and oxetanes. Exemplary of the oxiranes are the alkylene oxides such as ethylene oxide, 1,2-propylene oxide, butene oxides (butene-1-oxide and the cis- and trans-butene-2-oxides), isobutylene epoxide; substituted alkylene oxides such as epichlorohydrin, epibromohydrin, epifluorohydrin, methallyl chloride epoxide, trifluoromethyl ethylene oxide, perfluoropropylene oxide, perfluoroethylene oxide, vinyl chloride epoxide, dichloroisobutylene epoxide, etc.; cycloaliphatic epoxides such as cyclohexene oxides, vinyl cyclohexene monoxide, vinyl cyclohexene dioxide, α-pinene epoxide, dipentene epoxide, etc,; epoxy ethers such as alkyl glycidyl ethers, as, for example, methyl glycidyl ether, glycidyl ether, isopropyl glycidyl ether, isobutyl glycidyl ether, tert-butyl glycidyl ether, n-hexyl glycidyl ether, n-octyl glycidyl ether, etc.; phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether; unsaturated glycidyl ethers such as vinyl glycidyl ether, allyl glycidyl ether, o-allylphenyl glycidyl ether, etc.; glycidyl esters such as glycidyl acetate, glycidyl propionate, glycidyl pivalate, glycidyl methacrylate, glycidyl acrylate, glycidyl oleate, glycidyl resinate, etc.; alkyl glycidates such as methyl glycidate, ethyl glycidate, etc.; and other epoxides, as, for example, styrene oxide, α-methylstyrene oxide, butadiene monoxide, butadiene dioxide, epoxy stearates, 1-dimethylamino-2,3-epoxy propane, trimethyl 2,3-epoxypropyl ammonium chloride, etc. Particularly useful are ethylene oxide and its monosubstituted derivatives such as propylene oxide, epihalohydrins, etc.

The oxetanes which can be copolymerized with the epoxy silanes of this invention are characterized by the structural formula

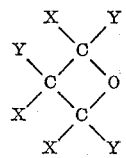

wherein each X and each Y substituent is any group other than those which react with the catalyst, such as free hydroxyl, primary amino, or secondary amino groups. By way of example, suitable X and Y substituents include such substituents as hydrogen; halogens including fluoro, chloro, bromo, and iodo substituent groups, alkyl, cycloalkyl, aryl, and aralkyl groups such as methyl, ethyl, propyl, butyl, cyclohexyl, phenyl, tolyl, benzyl, and the like; nitroalkyl such as nitromethyl, nitroethyl, and the like; nitratoalkyl such as nitratomethyl, nitratoethyl, and the like; cyanoalkyl such as cyanomethyl, cyanoethyl, and the like; alkoxy, aryloxy, aralkoxy, etc., such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like, tertiary aminoalkyl groups such as dimethylaminomethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals, containing an ethylenically unsaturated substituent and cycloalkyl radicals containing an ethylenic double bond in the ring, as, for example, 4-vinylcyclohexyl, α-terpinyl, γ-terpinyl, abietyl, cyclohexenylmethyl, o-allylphenyl, p-vinylbenzyl, and the like. Illustrative of typical oxetanes which the comonomer can comprise include oxetane, 2-bromo oxetane, 2-methyl oxetane, 2-cyclohexyl oxetane, 2-benzyl oxetane, 2-nitropropyl oxetane, 2-cyanoethyl oxetane, 2-methoxy oxetane, 2-phenoxy oxetane, 2-methoxyethyl oxetane, 2-benzyloxymethyl oxetane, 2-allyl oxetane, 2-vinylbenzyl oxetane, 2-chloromethyl oxetane, and the like; 2,2-bis(chloromethyl) oxetane, 2,2 - bis(2-chloroethyl) oxetane, 2,2-dimethyl oxetane, 2-chloro-2-methyl oxetane, 2-fluoro-2-bromomethyl oxetane, 2,2-bis(nitratomethyl) oxetane, 2-methoxy-2-methyl oxetane, 2-carbomethoxy-2-chloromethyl oxetane, 2-methallyl-2-methyl oxetane, and the like; 2-vinyl-3,3-bis(chloromethyl) oxetane, 2-methoxy-3,3-bis(bromomethyl) oxetane, 2-vinylbenzyl-3,3-dimethyl oxetane, 2-allyloxymethyl-3-chloromethyl-3-ethyl oxetane, 2-phenoxymethyl - 3 - fluoro - 3-methyl oxetane, and the like; 2-methyl-3,3-bis(chloromethyl)-4-methyl oxetane, 2-vinyl-3,3-bis(iodomethyl)-4-methoxy oxetane, 2-chloromethyl-3,3-dimethyl-4-chloromethyl oxetane, 2-chloro-3-ethyl-3-methoxymethyl-4-(o-allylphenyl) oxetane, 2-ethyl-3,3-bis(phenoxymethyl)-4-allyl oxetane, and the like; 2-methyl-3-methyl oxetane, 2-chloromethyl-3-bromo oxetane, 2-methoxy-3-butenyl oxetane, 2-methallyloxymethyl-3-ethyl oxetane, 2-propenyl-3-bromoethyl oxetane, 2-methoxymethyl-3-propyl oxetane, and the like; 3-chloro oxetane, 3-ethyl oxetane, 3-cyclohexyl oxetane, 3-phenyl oxetane, 3-methoxy oxetane, 3 - allyl oxetane, 3-chloromethyl oxetane, 3-vinyl oxetane, and the like; 3,3-bis(chloromethyl)-oxetane, 3,3-bis(bromomethyl) oxetane, 3,3-bis(iodomethyl) oxetane, 3,3-bis(fluoromethyl) oxetane, 3,3-bis(2-chloroethyl) oxetane, 3-bromomethyl-3-chloromethyl oxetane, 3,3-dimethyl oxetane, 3,3-diethyl oxetane, 3,3-bis(chloro) oxetane, 3,3-bis(bromo) oxetane, 3-chloro-3-chloromethyl oxetane, 3-bromo-3-ethyl oxetane, 3-fluoro-3-bromomethyl oxetane, 3-fluoro-3-chloro oxetane, 3-ethyl-3-methyl oxetane, 3-chloromethyl-3-ethyl oxetane, 3-chloromethyl-3-methyl oxetane, 3,3-bis(cyanomethyl) oxetane, 3,3-bis(nitratomethyl) oxetane, 3-chloromethyl-3-nitromethyl oxetane, 3-methoxy-3-methyl oxetane, 3-ethyl-3-methoxymethyl oxetane, 3-ethoxymethyl-3-methyl oxetane, 3-carbomethoxy-3 - chloromethyl oxetane, 3,3 - bis(phenoxymethyl) oxetane, 3vinyl-3-methyl oxetane, 3-allyl-3-chloromethyl oxetane, 3-isopropenyl-3-ethyl oxetane, 3-chloromethyl-3-(4-vinylcyclohexyl) oxetane, 3-methyl-3-methallyl oxetane, 3,3-bis(allyl) oxetane, and the like; 2-methyl-3-methyl-4-methyl oxetane, 2-ethyl-3-chloromethyl-4-ethyl oxetane, 2-chloromethyl-3-vinyl-4-chloromethyl oxetane, 2-methoxy-3-bromo-4-methyl oxetane, 2-allyl-3-methoxy-4-carbomethoxy oxetane, and the like; 2-methyl-4-methyl oxetane, 2-vinyl-4-chloroethyl oxetane, 2-chloro-4-allyl oxetane, 2-methoxy-4-ethyl oxetane, 2-chloromethyl-4-chloromethyl oxetane, 2 - chloromethyl - 4-cyanomethyl oxetane, and the like. Moreover, mixtures of two or more of any of the above oxiranes or oxetanes can be used as the comonomer component whenever it is desired, as, for example, to modify the properties of the end product.

The copolyethers of this invention contain from about 0.02% to about 40%, and preferably about 0.05% to about 20%, of the epoxy silane and the remainder comonomer, and have weight average molecular weights preferably of at least about 40,000, and more preferably of at least about 100,000, such molecular weights corresponding to a reduced specific viscosity (RSV) of at least about 0.2, and preferably of at least about 0.5. By the term "reduced specific viscosity" is meant $\eta$ sp/C determined on a 0.1% solution of the copolymer in a suitable solvent such as $\alpha$-chloronaphthalene at 100° C., cyclohexanone at 50° C., chloroform at 25° C., or benzene at 25° C.

The copolymerization of the epoxy silane with an oxirane or oxetane to high molecular weight polyethers can be readily carried out using as the catalyst an organoaluminum compound, preferably one which has been reacted with about 0.1 to about 1.5 moles of a chelating agent such as acetyl acetone, benzoyl acetone, acetoacetic acid, ethyl glycolate, oxalic acid, glyoxal monoxime, etc., and/or reacted with from about 0.1 to about 1.5 moles of water per mole of the organoaluminum compound. Exemplary of the organoaluminum compounds that can be so reacted with the chelating agent and/or water and used as catalyst are triethylaluminum, triisobutylaluminum, diethylaluminum hydride, etc. They can also be prepared by copolymerization of the above-mentioned epoxy silane and oxirane or oxetane using modified organozinc compounds and modified organomagnesium compounds, as, for example, diethyl zinc reacted with 0.2 to 1.2 moles of water per mole of zinc, and diethylmagnesium reacted with a polyreactive hydrogen compound such as water, glycols, ammonia, amines, ketones, etc., as, for example, with 0.1 to 1.2 moles of water or 0.2 to 0.8 mole of a polyhydric alcohol or polyhydric phenol.

A typical catalyst preparation is carried out by reacting a solution of the organometal compound, as, for example, triisobutylaluminum, in a mixture of n-heptane and ether as solvent with 0.5 mole of water per mole of aluminum and agitating the mixture at 30° C. for 16 to 20 hours. The polymerization is typically carried out by injecting the catalyst solution so prepared into a solution of the epoxy silane and the oxirane or oxetane in an inert diluent and agitating the mixture at room temperature or at elevated temperature for several hours or more.

Isolation of the copolymer will depend on the solubility properties of the copolymer. Isolation of soluble, uncross-linked copolymers will in some cases (depending on the amount and the reactivity of the $-SiZ_nY_{3-n}$ groups) require the strict exclusion of water during the isolation and drying of the reaction product. In such circumstances the presence of a water-scavenging agent in the reaction product will usually be most helpful. Suitable water-scavenging agents which can be employed include organic anhydrides, isocyanates, ketenes, etc., and preferably acetic anhydride, propionic anhydride, rosin anhydride, fatty acid anhydrides, phenyl isocyanate, naphthyl isocyanate, fatty acid ketene dimers, and the like. Such products containing a water-scavenging agent are particularly useful as sealants, coatings, and the like where the product can be cross-linked simply by exposure to atmospheric moisture.

The copolymers of this invention can also contain stabilizers such as ultraviolet light absorbers, antioxidants, particularly of the phenolic or aromatic amine type, antacids, and the like, as well as other additives such as plasticizers, fillers, as, for example, silica, asbestos, clay, carbon black, and the like, reactive silanes, etc. Typical reactive silanes which can also be incorporated in the copolymers include the tetraalkoxysilanes such as tetramethoxysilane, the trialkoxy monoalkylsilanes such as trimethoxymethylsilane, the dialkoxy dialkylsilanes such as dimethoxy dimethylsilane, the tetraacyloxysilanes such as tetraacetoxysilane, the triacyl monoalkylsilanes, the diacyl dialkylsilane, and the like.

The following examples illustrate the preparation of copolymers of this invention. All parts and percentages are by weight unless otherwise indicated. All examples were run under a nitrogen atmosphere. The molecular weight of the copolymers is indicated by their reduced specific viscosity (RSV) as determined on a 0.1% solution of the copolymer in $\alpha$-chloro-naphthalene at 100° C. unless otherwise indicated.

Examples 1–4

In each of these examples a polymerization vessel with a nitrogen atmosphere was charged with 40 parts toluene as diluent and 10 parts of a mixture of glycidoxypropyl trimethoxysilane and epichlorohydrin. After equilibrating at 30° C., 0.8 part of catalyst (triisobutylaluminum basis) was injected into each vessel. The catalyst in these examples was prepared by diluting a 1.0 molar solution of triisobutylaluminum in n-heptane to 0.5 molar with diethyl ether, adding water while stirring, in an amount equal to 0.5 mole per mole of aluminum over one hour at 20° C., and then agitating the catalyst mixture for 10 hours at room temperature. The polymerization were carried out by agitating the mixture for 19 hours at 30° C. and then shortstopping by adding 4 parts anhydrous ethanol to the reaction mixtures of Examples 1, 3, and 4 or by adding 5 parts of acetic acid to the reaction mixture of Example 2. In Examples 1 and 2, the reaction mixture was next diluted with 212 parts of diethyl ether to precipitate the copolymer product; and the ether-insoluble fraction was collected and washed once with diethyl ether and once with ethanol It was then washed with 1% hydrochloric acid in ethanol, filtered, washed neutral with ethanol and then once with 0.4% solution of 4,4'-thiobis(6-t-butyl-m-cresol) in methanol, and then was dried for 16 hours at 80° C. under vacuum.

In Examples 3 and 4, 4 parts of a 1% ethanolic solution of a phenolic antioxidant (the reaction product of 1 mole of crotonaldehyde ad 3 moles of 3-methyl-6-tert-butylphenol) was added to the reaction mixture and the polymer precipitated in a Waring blendor with an equal volume of commercial heptane containing 0.04% of the antioxidant. Then the heptane solution was decanted, the precipitate was washed twice with the same commercial heptane precipitant containing 0.04% of the antioxidant, was filtered, and then was dried for 16 hours at 80° C. under vacuum.

The isolated polymer from each of these examples was next extracted at room temperature with 40 parts of acetone per part of product for 16 hours and the acetone-insoluble fraction collected, washed twice with acetone and once with 0.05% of 4,4'-thiobis(3-methyl-6-tert-butylphenol) in acetone, and then dried for 16 hours at 50° C. under vacuum. The acetone-soluble fraction was evaporated to dryness and the recovered polymer dried for 16 hours at 80° C. under vacuum.

In Table I are set forth details as to polymerization, conversion, and properties of the copolymers.

3% aqueous hydrochloric acid for 15 minutes with stirring, and then washed neutral with water. A small amount (0.5%) of 4,4'-thiobis(3-methyl-6-tert-butylphenol) was added to the washed polymer solution, and the polymer, all of which was soluble, was isolated by removing the solvents and drying the polymer. The isolated copolymer was a tough film, had an RSV of 5.7 in 0.1% chloroform at 25° C., contained 0.34% of the silane monomer (based on sulfate ash analysis), and was obtained in 81% conversion.

Example 6

The procedure of Example 5 was repeated except that in this example 10 parts of a mixture of 98% trans-butene-2-oxide and 2% glycidoxypropyl trimethoxysilane was charged to the reaction vessel and the 3 millimoles of additional catalyst was injected into the vessel in 3 equal portions at the end of 3, 4, 5, and 6 hours of reaction time, the total reaction time being 22 hours. The isolated copolymer was a very tough solid obtained in 73% conversion and contained 0.8% of the silane monomer (based on silicon analysis). It was insoluble, but highly swollen, in chloroform, thus indicating that it had cross-linked during isolation. Next, 3.4 parts of the cross-linked polymer was agitated at room temperature with 180 parts of benzene (solvent for polytrans-butene-2-oxide) for 3 days after which time the insoluble polymer was collected, washed twice with benzene and once with benzene containing a small amount of 4,4'-thiobis(3-methyl-6-

TABLE I

| | Example | | | |
|---|---|---|---|---|
| | 1 | 2 | 3 | 4 |
| Monomer ratio (epichlorohydrin:glycidoxypropyl trimethoxysilane). | 95:5 | 97.5:2.5 | 99.5:0.5 | 99.8:0.2 |
| Isolated polymer: | | | | |
| Percent conversion | 21 | 30 | 39 | 39 |
| RSV | | | D0.6 | D0.74 |
| Crystallinity | Very low | Low | Low | Low |
| Description | Rubbery gel granules.[1] | Tough rubber.[2] | Tough whitish rubber. | Tough whitish rubber. |
| Percent glycidoxypropyl trimethoxysilane | 19.5[3] | | 1.1[4] | |
| Acetone-insoluble fraction: | | | | |
| Percent of total | 99 | 97[5] | 76.7 | 74.1 |
| Description | Rubbery gel granules. | Tough rubber. | Tough rubber. | Tough rubber. |
| Crystallinity | Very low | Low | None | Low |
| Acetone-soluble fraction: | | | | |
| Percent of total | 1 | 3 | 22 | 25 |
| RSV | | | 0.6 | 0.74 |
| Description | Adhering film. | Adhering film. | Tacky adhering rubber. | Tacky adhering rubber. |

[1] Prior to short-stopping, the reaction mixture was viscous and contained gel particles.
[2] Prior to short-stopping, the reaction mixture was a viscous solution.
[3] Based on chlorine analysis.
[4] Based on silicon analysis.
[5] Contained 12% glycidoxypropyl trimethoxysilane based on chlorine analysis.

Example 5

The general procedure of Examples 1 to 4 was repeated except that in this example 10 parts of a mixture of 99.5% transbutene-2-oxide and 0.5% of glycidoxypropyl trimethoxysilane was charged into a vessel containing 134 parts of methylene chloride. After equilibrating at −78° C., 1 millimole of catalyst solution was injected into the vessel and the polymerization was carried out by agitating the mixture for 2.3 hours at −78° C., after which time an additional 3 millimoles of catalyst solution was added and the agitation was continued for an additional 0.8 hour. The catalyst solution for this example was prepared by diluting a 1.0 molar solution of triisobutylaluminum in n-heptane to 0.5 molar with n-heptane, adding water while stirring in an amount equal to 0.5 mole per mole of aluminum dropwise over 15 minutes while stirring at 0° C. and then agitating the mixture for 15 minutes at 0° C. and then for 2 hours at room temperature. At the end of the polymerization period the reaction was short-stopped by the addition of 4 parts of anhydrous ethanol. The viscous reaction solution was then diluted with 3 volumes of diethyl ether, washed twice with tert-butylphenol) and then dried for 16 hours at 80° C. under vacuum. The insoluble product was a tough white solid and represented 68% of the total polymer. The benzene-soluble portion of the polymer after isolation represented 30% of the total polymer, had an RSV of 0.86 in chloroform at 25° C., and gave a tough, orientable film. Another portion of the cross-linked polymer was formed into film by compression molding at 150° C. in an electrically heated press under pressure for 2 minutes and then cooling to room temperature. The product was a clear, flexible, strong film which could be cold drawn at room temperature and had the following properties:

Tensile strength _____(p.s.i.)__ 2,400
Ultimate elongation _____percent__ 280
Modulus _____(p.s.i.)__ 33,000

Example 7

A polymerization vessel with a nitrogen atmosphere was charged with 50.6 parts of dry toluene, 8.5 parts of pure trimethylene oixde, and 0.8 part of a solution A containing 23.4 parts of toluene, 0.3 part of glycidoxypropyl trimethoxysilane and 3.0 parts of allyl glycidyl ether.

After equilibrating at 65° C., 0.8 part (triethylaluminum basis) of catalyst was injected into the vessel. The catalyst was prepared by diluting a 1.5 molar solution of triethylaluminum in n-heptane to 0.5 molar with diethyl ether, adding water while stirring, in an amount equal to 0.5 mole per mole of aluminum at 0° C. over a 1-hour period, followed by adding acetyl acetone with stirring in an amount equal to 1 mole per mole of aluminum at 0° C. over a period of 15 minutes, and then stirring for 1 hour at 0° C. and for 10 hours at 25° C. The reaction mixture was agitated for 4.8 hours at 65° C. during which time an additional 0.7 part of solution A was added at the end of each of 2 and 4 hours of reaction time, the total monomer charge to the reaction vessel being 96.7% trimethylene oxide, 0.3% glycidoxypropyl trimethoxysilane, and 3.0% allyl glycidyl ether. The reaction was short-stopped by the addition of 4 parts of a mixture of equal volumes of ethanol and acetyl acetone, and the mixture agitated overnight at 65° C., after which time the very viscous solution was precipitated with 5 volumes of n-heptane in a Waring blendor. After the n-heptane solution was decanted, the precipitate was washed twice with n-heptane and once with 0.1% 4,4'-thiobis(3-methyl-6-tert-butylphenol) in n-heptane, was filtered, and then was dried at 80° C. for 16 hours under vacuum. The isolated polymer was obtained in 39% conversion and was an extremely tough rubber which was insoluble in chloroform, indicating that it had cross-linked during isolation. Prior to isolation, the polymer had an RSV greater than 10 in chloroform at 25° C.

Example 8

The procedure of Example 7 was repeated except that the allyl glycidyl ether was omitted. The isolated copolymer was a very tough rubber which cross-linked during isolation and was insoluble in chloroform, which was a solvent for the copolymer prior to isolation.

Example 9

A polymerization vessel with a nitrogen atmosphere was charged with 38 parts of dry toluene, 9.0 parts of epichlorohydrin, 1.0 part of ethylene oxide, and 0.02 part of glycidoxypropyl trimethoxysilane. After equilibrating at 30° C., 0.22 part (triethylaluminum basis) of the catalyst of Example 7 was injected into the vessel and the polymerization was carried out by agitating the mixture for 19 hours at 30° C. The reaction was short-stopped with 4 parts of ethanol, and the viscous solution, which represented 18% conversion, was worked up in the same manner as Examples 3 and 4. The heptane-insoluble product was a very tough, rubbery terpolymer which had cross-linked on isolation (largely insoluble in chloroform) and contained 58% epichlorohydrin, 41.6% ethylene oxide, and 0.4% glycidoxypropyl trimethoxysilane based on chlorine and silicon analyses.

Examples 10–13

In each of these examples a polymerization vessel with a nitrogen atmosphere was charged with toluene as diluent and 10 parts of a mixture of bis(trimethylsiloxy) glycidoxypropyl methylsilane and epichlorohydrin and/or ethylene oxide. After equilibrating at 30° C., catalyst was injected into each vessel and the polymerizations were carried out by agitating the mixtures at 30° C. The reactions were short-stopped by adding 4 parts of a mixture of equal volumes of ethanol and acetyl acetone and the polymers precipitated in a Waring blendor with an equal volume of commercial heptane containing 0.04% of phenolic antioxidant (the reaction product of 1 mole of crotonaldehyde and 3 moles of 3-methyl-6-tert-butylphenol). Then the heptane solution was decanted, the precipitate was washed twice with the same commercial heptane precipitant containing antioxidant, was filtered, and then was dried for 16 hours at 80° C. under vacuum. The polymerizations of Examples 10 and 11 were carried out for 24 hours using 0.8 part (triisobutylaluminum basis) of the catalyst of Examples 1 to 4 and the polymerizations of Examples 12 and 13 were carried out for 1 and 19 hours, respectivcely, using 0.22 part (triethylaluminum basis) of the catalyst of Example 7.

In Table II are set forth details as to polymerization, conversion, and properties of the copolymers. The heptane-soluble polymer fractions of Examples 10 and 11 were isolated by concentrating the heptane filtrate and washings decanted from the Waring blendor, adding 4 volumes of methanol to the concentrate to precipitate the polymer, filtering off the polymer, washing the polymer twice with methanol and once with methanol containing 0.1% 4,4'-thiobis(3-methyl-6-tert-butylphenol) in methanol, and then drying for 16 hours at 80° C. under vacuum.

TABLE II

| | Example | | | |
|---|---|---|---|---|
| | 10 | 11 | 12 | 13 |
| Monomer (percent): | | | | |
| Epichlorohydrin | 90 | 70 | | 85. |
| Ethylene oxide | | | 90 | 10. |
| BTGMS [1] | 10 | 30 | 10 | 5. |
| Diluent (parts) | 40 | 40 | 40 | 38. |
| Total percent conversion [2] | 33 | 16 | | |
| Isolated polymer: | | | | |
| Heptane-insoluble fraction: | | | | |
| Percent conversion | 18 | 1.5 | 26 | 17. |
| RSV | 2.7 | 4.5 | 8.4 [4] | 4.5. |
| Percent comonomer | 12 [3] | | 0.44 [3] | 58.1.[5] |
| Crystallinity | None | Low | Very low | None. |
| Description | Tough rubber. | Tough rubber. | Tough, white solid. | Tough rubber. |
| Heptane-soluble fraction: | | | | |
| Percent conversion | 5.3 | 13.7 | | |
| RSV | 1.3 | 2.4 | | |
| Percent comonomer | 29 [3] | | | |
| Crystallinity | None | None | | |
| Description | Tacky rubber. | Tacky rubber. | | |

[1] Bis(trimethylsiloxy)glycidoxypropyl methylsilane.
[2] Solids basis.
[3] Based on chlorine analysis.
[4] Determined on a 0.1% solution in chloroform at 25° C.
[5] 56% epichlorohydrin based on chlorine analysis and 2.1% bis(trimethylsiloxy)glycidoxypropyl methylsilane based on sulfate ash.

The foregoing examples demonstrate the production of epoxy silane-oxirane or oxetane copolymers. Thus, the invention provides a ready source of silicon-containing copolymers which are particularly useful. Due to the ease with which these copolymers are activated by water and cured at room temperature, they provide an excellent source of elastomeric compositions which can be cured in place of atmospheric moisture and thus provide very desirable one-component systems for use in coatings, sealants, and the like. Moreover, the presence of only very small amounts, as, for example, from 0.1 to 1%, of the epoxy silane in the polyether functions to chemically bond the polyether to reinforcing fillers such as silicas, clays, etc., to yield products with superior physical properties. The products of the invention are either amorphous or crystalline polymers useful as elastomers as for elastic fibers, foams, molded particles, gaskets, and the like, or as hard, tough plastics, films, fibers, molded articles, and the like, or as improved plastomeric compositions.

The following examples illustrate the vulcanization of the copolymers of this invention.

Examples 14-16

These examples demonstrate the vulcanization of the copolymers of Examples 3, 4, and 9. The vulcanizable formulations were compounded on a 2-roll mill using a front roll temperature of 120° F. and a back roll temperature of 180° F. The ingredients in each formulation are tabulated below.

| Ingredients (parts) | Example | | |
|---|---|---|---|
| | 14 | 15 | 16 |
| Copolymer of Ex. 3 | 100 | | |
| Copolymer of Ex. 4 | | 100 | |
| Terpolymer of Ex. 9 | | | 100 |
| Zinc stearate | 1.0 | 1.0 | 1.0 |
| High reinforcing silica [1] | 30 | 30 | 30 |
| Zinc oxide | 2.0 | 2.0 | 2.0 |
| Red lead | 3.0 | 3.0 | 3.0 |
| Nickel dibutyl dithiocarbamate | 1.0 | 1.0 | 1.0 |
| 2-mercaptoimidazoline | 1.5 | 1.5 | 1.5 |

[1] A fumed amorphous silica having spherical particles of average size 0.007 micron, a density of 2.3 lbs./cu. ft., and a surface area of 325 sq. meters/gram.

Each formulation was cured in a steel press for 45 minutes at a temperature of 340° F. The resulting vulcanizates were tested and their physical properties are tabulated below.

| Properties | Example | | |
|---|---|---|---|
| | 14 | 15 | 16 |
| Modulus (p.s.i.) at— | | | |
| 200% elongation | 1,720 | 1,345 | |
| 300% elongation | 2,100 | 1,680 | 1,500 |
| Tensile strength (p.s.i.) | 2,345 | 2,105 | 4,200 |
| Elongation, percent at max | 375 | 460 | 600 |
| Shore hardness (A-2) | 74 | 70 | |
| Break set (percent) | 20 | 10 | |
| Graves tear (lbs./in.)[1] | 308 | 280 | |

[1] ASTM D624-54.

The vulcanizate of Example 16 additionally showed improved tear strength and elastic recovery properties over a similar copolymer prepared from epichlorohydin and ethylene oxide without the glycidoxypropyl trimethoxysilane and vulcanized in the same manner.

What I claim and desire to protect by Letters Patent is:

1. A high molecular weight polyether comprising a copolymer of an epoxy silane of the formula $RSiZ_nY_{3-n}$, where R is a vicinal monoepoxy-substituted organic radical attached to silicon through a Si—C linkage; Z is any one of a member selected from the group consisting of —OR', —OSiR''$_3$, halogen, hydrocarbon, and halohydrocarbon; Y is any one of a member selected from the group consisting of —OR', —OSiR''$_3$, halogen, and hydrogen; and $n$ is a whole number of 1 to 2 wherein R' is a member selected from the group consisting of alkyl, aryl, cycloalkyl, aralkyl, alkoxyalkyl, haloalkyl, alkaryl, and haloaryl and R'' is a member selected from the group consisting of hydrogen, hydrocarbon, and halohydrocarbon radicals, and a comonomer selected from the group consisting of oxiranes different from the epoxy silane and oxetanes.

2. The polyether of claim 1 wherein the epoxy silane is glycidoxypropyl trimethoxysilane.

3. The polyether of claim 1 wherein the epoxy silane is bis(trimethylsiloxy)glycidoxypropyl methylsilane.

4. The polyether of claim 2 wherein the comonomer is trans-butene-2-oxide.

5. The polyether of claim 2 wherein the comonomer is a mixture of trimethylene oxide and allyl glycidyl ether.

6. The polyether of claim 2 wherein the comonomer is epichlorohydrin.

7. The polyether of claim 2 wherein the comonomer is a mixture of epichlorohydrin and ethylene oxide.

8. The polyether of claim 3 wherein the comonomer is epichlorohydrin.

9. The polyether of claim 3 wherein the comonomer is ethylene oxide.

10. The polyether of claim 3 wherein the comonomer is a mixture of epichlorohydrin and ethylene oxide.

No references cited.

WILLIAM H. SHORT, *Primary Examiner.*

T. PERTILLA, *Assistant Examiner.*